US009666051B2

(12) United States Patent
Rossotto et al.

(10) Patent No.: US 9,666,051 B2
(45) Date of Patent: May 30, 2017

(54) METHOD AND A DEVICE FOR DETECTING ICING AT AN AIR INLET OF A TURBOSHAFT ENGINE (71) Applicant: AIRBUS HELICOPTERS, Marignane (FR)

(72) Inventors: Regis Rossotto, Marseilles (FR); Emmanuel Camhi, Fuveau (FR)

(73) Assignee: Airbus Helicopters, Marignane (FR)

( * ) Notice: Subject to any disclaimer, the term of this patent is extended or adjusted under 35 U.S.C. 154(b) by 84 days.

(21) Appl. No.: 14/809,876

(22) Filed: Jul. 27, 2015

(65) Prior Publication Data
US 2016/0035203 A1 Feb. 4, 2016

(30) Foreign Application Priority Data

Jul. 29, 2014 (FR) ...................................... 14 01738

(51) Int. Cl.
G08B 19/02 (2006.01)
B64D 15/20 (2006.01)

(52) U.S. Cl.
CPC ............. *G08B 19/02* (2013.01); *B64D 15/20* (2013.01)

(58) Field of Classification Search
CPC .................................. G08B 19/02; B64D 15/20
See application file for complete search history.

(56) References Cited

U.S. PATENT DOCUMENTS

| 6,304,194 | B1 | 10/2001 | McKillip |
| 7,374,404 | B2 | 5/2008 | Schilling |
| 7,487,029 | B2* | 2/2009 | Feeney ................... F01D 19/00 415/17 |
| 7,532,970 | B1* | 5/2009 | Lardillon .................. F02C 9/00 701/1 |
| 8,049,147 | B2 | 11/2011 | Hogate |

(Continued)

FOREIGN PATENT DOCUMENTS

| EP | 2110314 | 10/2009 |
| EP | 2623746 | 8/2013 |

(Continued)

OTHER PUBLICATIONS

French Search Report for French Application No. FR 1401738, Completed by the French Patent Office on Apr. 15, 2015, 7 Pages.

(Continued)

*Primary Examiner* — Jerrah Edwards
*Assistant Examiner* — Majdi Alsomiri
(74) *Attorney, Agent, or Firm* — Brooks Kushman P.C.

(57) ABSTRACT

A method of detecting that an aircraft is flying in icing conditions. A processor unit determines a real power developed by the turboshaft engine and a theoretical power that the engine can develop in theory, the theoretical power being determined using a theoretical model supplying a power as a function at least of a speed of rotation of a gas generator of the engine. The processor unit determines a difference between the real power and the theoretical power. The processor unit generates a warning to indicate the presence of icing conditions when the power difference is greater than a predetermined power threshold for a length of time longer than a time threshold, and when a temperature outside the aircraft lies between a low temperature threshold and a high temperature threshold.

20 Claims, 1 Drawing Sheet

(56) References Cited

U.S. PATENT DOCUMENTS

| | | | | |
|---|---|---|---|---|
| 2008/0125931 A1* | 5/2008 | Gaulmin | ............... | F02C 9/00 |
| | | | | 701/31.4 |
| 2010/0204931 A1* | 8/2010 | Ling | ............... | G05B 23/0283 |
| | | | | 702/41 |
| 2014/0090456 A1 | 4/2014 | Meisner et al. | | |
| 2014/0200844 A1 | 7/2014 | Evrard et al. | | |

FOREIGN PATENT DOCUMENTS

| | | |
|---|---|---|
| EP | 2657133 | 10/2013 |
| GB | 2046690 | 11/1980 |
| GB | 2259895 | 3/1993 |
| WO | 2008138846 | 11/2008 |

OTHER PUBLICATIONS

Chinese First Office Action Dated Nov. 28, 2016, Application No. 201510442622.4, Applicant Airbus Helicopters, 11 Pages.

* cited by examiner

METHOD AND A DEVICE FOR DETECTING ICING AT AN AIR INLET OF A TURBOSHAFT ENGINE

CROSS REFERENCE TO RELATED APPLICATION

This application claims priority to French patent application No. FR 14 01738 filed on Jul. 29, 2014, the disclosure of which is incorporated in its entirety by reference herein.

BACKGROUND OF THE INVENTION (1) Field of the Invention

The present invention relates to a method and to a device for detecting icing at an air inlet of a turboshaft engine. The invention is situated more particularly in the field of systems for detecting icing of an engine of an aircraft.

(2) Description of Related Art

An aircraft, and in particular a rotorcraft, can encounter icing conditions while in flight. Thus, ice can accumulate on certain portions of the aircraft as a function of atmospheric conditions.

More precisely, ice can become deposited on members of an air inlet. For example, the engine may have a grid protecting the air inlet that is in danger of picking up ice in icing environmental conditions.

The ice can tend to obstruct the air inlet, at least in part.

The ice can also become detached and can be ingested by the engine. Ingested ice can then damage the blades of the engine compressor and/or can give rise to flame-out of the engine.

Under such circumstances, certain aircraft are not authorized to fly in icing conditions. In spite of this prohibition, certification regulations require a manufacturer to demonstrate that flight in icing conditions is possible during some limited length of time.

This limited length of time is determined as a function of the time needed for a pilot to become aware of the presence of icing conditions and/or of the time needed to exit icing conditions, e.g. by coming closer to the ground.

Other aircraft are provided with devices for flying in limited icing conditions. Such devices can than be activated during a stage of flight in icing conditions.

Independently of the ability of the aircraft to fly in icing conditions, a system of the aircraft or a crew member may be required to determine that icing conditions are present.

Such detection of icing conditions sometimes relies on the ability of the pilot to detect such conditions. A measurement of the outside temperature is not sufficient to be able to assert that an aircraft is flying in icing conditions. Under such circumstances, a pilot can sometimes detect the presence of icing conditions by observing the windshield of the aircraft or certain pieces of equipment having an opening to the outside. Thus, the presence of ice on the windshield or on external probes is the main indicator of icing conditions for a pilot.

Certain aircraft may then for example be fitted with ice sensors. The location of ice sensors needs to be selected with care.

Document U.S. Pat. No. 6,304,194 B1 describes a method of detecting icing on a tilting rotor of an aircraft. The rotor is capable of tilting from a hovering flight position to a forward flight position, so arranging ice sensors can be difficult.

In that method, the torque of the rotor is measured, which torque is referred to for convenience as the "measured" torque, and the thrust generated by the rotor is also measured, which thrust is referred to as the "measured" thrust, by convenience. The measured torque and the measured thrust are then compared with a model and an error signal is generated as a result of the comparison.

In addition, the signal transmitted by an icing sensor is transmitted to the model, and said error signal is modified as a function of that comparison.

Document WO 2008/138846 describes a method based on using a test device.

Thus, a surface of the test device is covered in a material liable to pick up ice. The surface is then caused to move at a predetermined speed for a predetermined length of time.

The thickness or the weight of ice picked up is then measured in order to determine the concentration of supercooled snow and water in the air.

Document EP 2 657 133 presents a device for providing protection against icing, which protection is provided in particular by using an icing sensor to control energy sources for combating the formation or the accumulation of ice.

Document EP 2 110 314 is remote from the problem of detecting icing conditions, since it proposes a method and a device for providing protection against icing. Such a device includes electric heater components.

Likewise, Document U.S. Pat. No. 8,049,147 describes a system having three heaters for preventing icing of a turbine.

Document U.S. Pat. No. 7,374,404 is also remote from the problem of the invention. Specifically, Document U.S. Pat. No. 7,374,404 suggests applying a polyurethane coating on certain portions of a blade of a gas turbine engine in order to prevent excessive accumulation of ice.

Document US 2014/0090456 is remote from the invention.

According to Document US 2014/0090456, the temperature and the pressure of air at the inlet to a gas turbine engine compressor needs to be monitored specifically for properly controlling the engine. The temperature and pressure may be used for detecting the presence of icing.

Under such circumstances, Document US 2014/0090456 describes a system for detecting a measurement fault on the basis of a theoretical model of the engine, of a comparator module, and of an estimator module for estimating inlet conditions.

The engine model serves to establish the estimated value of at least one engine parameter, each engine parameter being selected from a list including the speed of rotation of a rotary member of the engine, a combustion pressure, and an exhaust gas temperature.

The comparator module is then configured to establish the difference between the measured values of those engine parameters and the estimated values.

The difference is used by the estimator module in order to adjust the engine inlet parameters used by the engine control relationship. Those inlet parameters include the temperature and the pressure of the air at the inlet to a compressor of the engine.

Furthermore, sensors measure the value of those inlet parameters.

If the measured values of the inlet parameters differ from the estimate made by the estimator module, then an error signal is issued. Furthermore, the estimated inlet parameters are used for generating the control relationship. Otherwise, the measured inlet parameter values are used for generating the control relationship.

Documents GB 2 259 895 and GB 2 046 690 are also known.

Document EP 2 623 746 is remote from the invention, which seeks to detect icing conditions, since that Document EP 2 623 746 seeks to optimize performance.

BRIEF SUMMARY OF THE INVENTION

An object of the invention is to determine the presence of icing conditions automatically, i.e. without involving active monitoring on the part of a pilot.

The invention thus provides a method of detecting that an aircraft is flying in icing conditions, the aircraft having at least one turboshaft engine receiving air coming from a medium outside the aircraft via an air inlet, the engine comprising a gas generator provided with at least one compressor and a combustion chamber, the engine further comprising a power assembly having at least one power turbine driven in rotation by exhaust gas from said combustion chamber.

The power turbine is then connected to at least one lift and/or propulsion member of the aircraft. For example, the power turbine is connected at least by means of a main gearbox to a lift and/or propulsion rotor.

Such a power turbine is sometimes called a "working turbine" because of its function, which consists in driving a member outside the engine, as contrasted to a gas generator turbine, for example.

The power turbine may be a turbine connected to the gas generator, or it may be independent of the gas generator.

Furthermore, the method is remarkable in particular for the following steps:

a processor unit determining a real power developed by the engine as a function of the torque developed by said power assembly as measured by a torque measurement system, and of a speed of rotation of the power assembly referred to as the "second" speed of rotation as measured by a speed measurement system;

said processor unit determining a theoretical power that said engine can develop in theory, said theoretical power being determined by the processor unit as a function at least of a theoretical model of the engine, said theoretical model providing a power as a function at least of a speed of rotation of said gas generator, as measured by speed measurement means and referred to as the "first" speed of rotation;

the processor unit determining a difference referred to as the "power" difference between said real power and said theoretical power; and the processor unit generating a warning to indicate the presence of icing conditions when:
  said power difference is greater than a predetermined power threshold for a duration longer than a time threshold; and
  an outside temperature of said outside medium as measured by a temperature sensor lies between a low temperature threshold and a high temperature threshold.

Consequently, the processor unit continuously receives the value of the torque Tq being delivered by the engine. The torque Tq is based on a simplex type measurement performed on the engine, e.g. by using a conventional torque measurement system.

In addition, the processor unit continuously receives the value of a second speed of rotation of the power assembly, referred to as "N2", by the person skilled in the art. This value is measured by a conventional speed measurement system.

Under such circumstances, the processor unit acts at a sampling frequency to determine the real power delivered by the engine.

Furthermore, the processor unit determines a theoretical power. The theoretical power is given by a theoretical model of the engine as determined by testing. The theoretical model gives the theoretical power that the engine ought normally to supply as a function of the first speed of rotation of the gas generator.

Certain aircraft, and in particular rotorcraft, have the feature of presenting air inlets that are protected either by grids, or by filters based on barriers or on vortex technology.

As a result, when the aircraft encounters icing conditions, ice accumulates on the air inlet protection and partially obstructs the passage of air to the gas generator. Such obstructions create head loss that leads to a reduction in the air pressure between upstream infinity and downstream from the air inlet.

Consequently, the flow rate of fuel transmitted to the engine needs to be increased in order to keep the power delivered by the engine constant.

Under "normal" conditions, the power delivered by the engine is substantially proportional to the first speed of rotation N1.

The ratio between the power delivered by the engine and the first speed of rotation N1 is known and can be modeled by a thermodynamic model of the engine. That thermodynamic model is a theoretical model used by the processor unit.

If the air inlet becomes clogged by air, the first speed of rotation N1 increases to keep the power delivered by the engine constant. The ratio of the power delivered by the engine to the first speed of rotation N1 is thus modified and no longer corresponds to the normal ratio.

Nevertheless, the ratio between the power delivered by the engine and the first speed of rotation N1 can also be modified in non-icing conditions as a result of the engine becoming dirty, as a result of particular air temperature conditions, as a result of transient maneuvers of the aircraft, etc.

It is therefore not obvious in any way to use that ratio for the purpose of determining the presence of icing conditions.

Furthermore, the theoretical power can be difficult to estimate given the aging of an engine and the power losses that result from the engine being installed on an aircraft.

In this context, the invention proposes comparing the power difference between said real power and said theoretical power with a power threshold.

An increase of the order of 1% in the head loss in the air inlet leads to a loss of power from the engine of 1% to 2%, depending on ambient atmospheric conditions.

Consequently, according to the invention, if said power difference is greater than the power threshold during a significant length of time, then the phenomenon leading to the increase in the power difference is not a transient phenomenon. The air inlet is then potentially obstructed by ice.

Consequently, the invention proposes generating a warning if, in addition, the outside temperature lies in a predetermined temperature range.

The invention thus consists in continuously verifying that a plurality of criteria are satisfied. When those criteria are satisfied, the processor unit deduces that the air inlet of the engine is obstructed by ice, and informs the crew by a visual and/or audible warning.

The pilot can then carry out actions set down in the flight manual for optimizing flight safety.

The invention thus makes it possible to make the detection of the presence of ice in the air inlet of an engine automatic, i.e. without involving human judgment. This detection serves to warn the pilot of the presence of icing conditions. More generally, the method makes it possible to detect clogging of an air inlet.

Furthermore, the method also makes it possible to detect drift in an item of information, and specifically drift in the value of the real power. This characteristic is of interest when the information is derived from non-redundant instrumentation, specifically the value of the torque as measured by a simplex system.

The method may also include one or more of the following characteristics.

Thus, the processor unit may determine the theoretical power as a function of a power referred to as the "bench guaranteed minimum power", the theoretical model of the engine providing the bench guaranteed minimum power as a function of the pressure and the temperature of the outside air in the outside medium, of the first speed of rotation, and of the second speed of rotation.

A manufacturer then places the engine on an engine test bench in order to establish the theoretical model by conventional testing.

Furthermore, the processor unit determines said theoretical power as a function of a power referred to as the "bench guaranteed minimum power" as corrected using at least one parameter selected from a list including installation losses representing power losses resulting from arranging the engine on an aircraft, and an operating margin of the engine representing a power margin of the engine compared to the bench guaranteed minimum power.

Under such circumstances, the processor unit then:
determine a power referred to as the "engine-installed guaranteed minimum power" that the engine can develop while arranged on the aircraft; and
determine said theoretical power:
by adding to said engine-installed guaranteed minimum power an operating margin obtained during an engine health check; and/or
by subtracting from said engine-installed guaranteed minimum power the installation losses that are a function of a stored installation loss model.

In particular, the processor unit may then:
determine a power referred to as the "engine-installed guaranteed minimum power" that the engine can develop while arranged on the aircraft;
determine an operating margin relative to said engine-installed guaranteed minimum power, said operating margin being established and transmitted to the processor unit by an engine health monitoring system; and
determine said theoretical power, said theoretical power being equal to the sum of said operating margin plus said engine-installed guaranteed minimum power.

A manufacturer can determine an engine-installed guaranteed minimum power. Nevertheless, a given engine may be capable of producing power greater than the guaranteed power.

In order to know the power genuinely available in flight, an aircraft may include an engine health monitor system.

The engine health monitoring system performs a method of determining the operating margin of the engine relative to the installed guaranteed minimum power. Engine health is monitored at regular intervals, of the order of 25 hours.

Consequently, the invention proposes using the most recently known operating margin for the purpose of determining the theoretical power available from the engine installed on the aircraft.

Reference may be made to the literature in order to obtain a description of an engine health monitor system for an aircraft.

In order to determine the engine-installed guaranteed minimum power, the following procedure may be applied.

In this procedure, the processor unit:
determines a power referred to as the "bench guaranteed minimum power" that the engine can develop while arranged on a bench;
determines the installation losses as a function of a stored installation loss model;
determines said engine-installed guaranteed minimum power, said engine-installed guaranteed minimum power being equal to the difference between said bench guaranteed minimum power and said installation losses.

This procedure suggests using a model to identify installation losses.

The power delivered by an engine can be reduced on an aircraft compared with the power it delivers on a bench. Installation losses then represent the difference between the power delivered by the engine when arranged on a bench, and the power delivered by the engine when installed on an aircraft. This difference is a function of the types of the air inlet and the nozzle fitted to the engine installed on the aircraft. Furthermore, installation losses may vary as a function of flying circumstances (level flight, climbing, hovering, high or low speed, side slip, . . . ).

Thus, the installation loss model may supply said installation losses as a function of the pressure and the temperature of the air in the outside medium, and also as a function of a travel speed of the aircraft.

This travel speed may be the indicated air speed, commonly referred to by the acronym IAS.

The installation loss model may be established by testing.

Finally, the processor unit may determine the bench guaranteed minimum power from said theoretical model of the engine, said theoretical model of the engine providing said bench guaranteed minimum power as a function of the pressure and of the temperature of said air in said outside medium, of the first speed of rotation of said gas generator, and of the second speed of rotation.

Under such circumstances, during the first stage, the processor unit determines the theoretical power.

For this purpose, during a first step of the first stage, the processor unit determines the bench guaranteed minimum power from said theoretical model of the engine.

During a second step of the first stage, the engine-installed guaranteed minimum power is determined in order to take account of installation losses.

Under such circumstances, and during a third step of the first stage, the processor unit deduces therefrom the theoretical power by taking into consideration the operating margin of the engine relative to a guaranteed minimum power.

During a second stage that may for example be performed in parallel with the first stage, the processor unit determines the real power.

During a comparison third stage, the processor unit determines the power difference between the theoretical power and the real power as obtained by measurements.

As a function of this power difference and of the outside temperature, the processor unit can act during a fourth stage to determine whether environmental conditions are icing conditions.

Furthermore, the low temperature threshold may be equal to −10 degrees Celsius, for example.

The high temperature threshold may be equal to +5 degrees Celsius.

The resulting temperature range is then representative of the temperatures applicable to icing conditions.

Furthermore, the time threshold may be 30 seconds.

The time threshold is short enough to enable information about icing conditions to be obtained quickly, while being long enough to limit any risk of untimely detection of icing.

Furthermore, the power threshold may be 150 newton-meters (Nm), for example.

The value of the power threshold is established during test flights. This value takes account of all of the information from measurements, from the result of engine health monitoring, and also of the uncertainties due to installation effects that can be difficult to measure, such as air or electricity being taken from the engine.

In particular, the power threshold value is high enough to ensure that the above-mentioned uncertainties are of the second order, and leaves no doubt about the fact that power is being lost as a result of icing, and of icing only.

In addition to a method, the invention provides a detector device for an aircraft in order to detect the presence of icing conditions on board an aircraft, the aircraft having at least one turboshaft engine, said engine comprising a gas generator having at least one compressor and a combustion chamber, the engine further comprising a power assembly having at least one power turbine driven in rotation by exhaust gas from said combustion chamber.

The detector device comprises:
- a torque measurement system for measuring the torque developed by said power assembly;
- a speed measurement system for measuring a speed of rotation of the power assembly, referred to as the "second" speed of rotation, and speed measurement means for measuring a speed of rotation of said gas generator, referred to as the "first" speed of rotation;
- a warning system;
- a temperature sensor for measuring the temperature of the air in an outside medium situated outside the aircraft; and a processor unit connected to the torque measurement system and to the speed measurement system and to the warning system and to the temperature sensor, said processor unit comprising a storage device and a calculation unit, said storage device storing a theoretical model supplying a power as a function at least of the first speed of rotation, said calculation unit executing instructions from said storage device in order to perform the method as described above.

The detector device may include one or more of the following characteristics.

Thus, the detector device may include an engine health monitoring system co-operating with the processor unit.

Furthermore, the detector device may include an installation loss model stored in the storage device.

In addition, said detector device includes a pressure sensor for measuring the pressure of the air outside the aircraft.

Finally, said detector device may include a speed measurement device for measuring the travel speed of the aircraft.

In addition to a detector device, the invention relates to an aircraft having a turboshaft engine, the aircraft also including such a detector device.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

Elements that are present in more than one of the figures are given the same references in each of them.

DETAILED DESCRIPTION OF THE INVENTION

Figure 1:
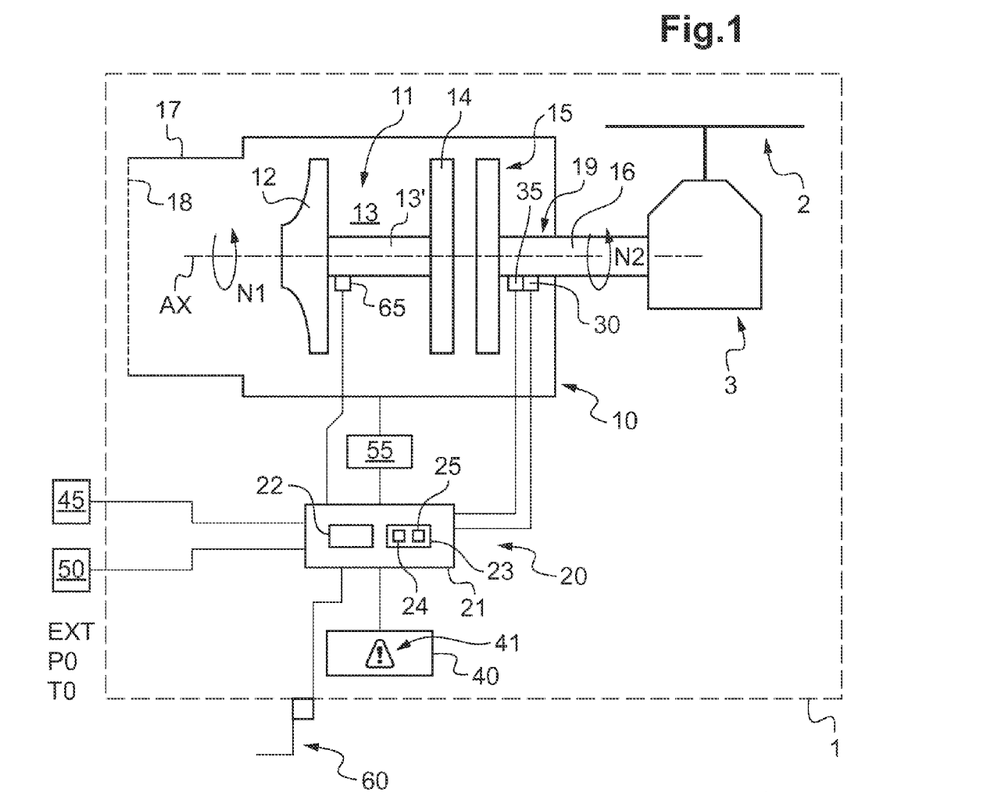
FIG. 1 is a view of the device of the invention.

FIG. 1 shows an aircraft 1 of the invention.

In particular, the aircraft 1 includes a lift and/or propulsion rotor 2. The rotor 2 is driven in rotation by a power plant comprising at least one turboshaft engine 10 and at least one main gearbox 3.

The engine 10 includes a gas generator 11. The gas generator is conventionally provided with at least one compressor 12, a combustion chamber 13, and at least one expansion turbine 14 connected to the compressor 12 by a main shaft 13'.

FIG. 1 shows a single compressor 12 and a single expansion turbine 14. Nevertheless, the numbers of compressors and of expansion turbines can be optimized depending on requirements, and put no restriction on the scope of the invention.

Furthermore, the compressor 12, the expansion turbine 14, and the main shaft 13' connecting them together mechanically are suitable for rotating together about a longitudinal axis AX of the engine. More precisely, the compressor 11, the expansion turbine 14, and the main shaft 13' are constrained to rotate together about this longitudinal axis.

The speed of rotation of the gas generator must thus be understood as being the first speed of rotation N1 of the rotary assembly of the gas generator that comprises the compressor 12 together with the expansion turbine 14 and the main shaft 13'.

Furthermore, the engine 10 has a power assembly 19 situated downstream from the gas generator. The power assembly is driven by the gas generated by the combustion chamber.

The power assembly 19 comprises at least one power turbine 15 situated downstream from the combustion chamber 13. The power turbine may be connected to the gas generator or it may be independent of the gas generator, as shown in FIG. 1.

Under such circumstances, the power turbine 15 is secured to a power shaft 16 suitable for driving an element outside the engine, such as the main gearbox 3, for example.

FIG. 1 shows a power assembly including a single power turbine 15. Nevertheless, the number of power turbines may be optimized depending on requirements, and puts no restriction on the scope of the invention.

The gas leaving the combustion chamber then causes the power assembly of the engine to rotate at a second speed of rotation N2.

Furthermore, the aircraft 1 has an air inlet 17 conveying the air present in the outside medium EXT surrounding the aircraft to the gas generator 11.

This air inlet may include filter means 18, such as a grid, for example.

Furthermore, the aircraft 1 has a detector device 20 for detecting whether the aircraft is flying under icing conditions.

The detector device 20 includes a processor unit 21. The processor unit 21 has a storage device 23 and a calculation unit 22. By way of example, the calculation unit may comprise a processor or the equivalent executing instructions stored in the storage device. The storage device may include a non-volatile memory storing such instructions and a volatile memory storing parameter values, for example.

The processor unit may be an integral portion of a control system of a turboshaft engine, such as a system known as an engine control unit (ECU) or as a full authority digital engine control (FADEC). Under such circumstances, the calculation unit of the processor unit is the calculation unit of the control system, the storage device being the storage device of the control system.

The storage device stores a theoretical model 24 of the operation of the engine. This theoretical model 24 is usually obtained by testing. Under such circumstances, the theoretical model 24 determines the power delivered by the power assembly of the engine as a function of at least the first speed of rotation N1 of the engine.

In particular, the theoretical model 24 can provide a bench guaranteed minimum power Wmini of the engine. This bench guaranteed minimum power Wmini represents the power that the manufacturer guarantees throughout the lifetime of the engine. This bench guaranteed minimum power Wmini is determined by performing tests on test benches, and thus away from an aircraft.

The theoretical model 24 can then deliver the bench guaranteed minimum power Wmini as a function:

of the outside pressure P0 and of the outside temperature T0 of the air penetrating into the engine, and thus of the air present in the outside medium EXT situated outside the aircraft; of the first speed of rotation N1 of the gas generator; and of the second speed of rotation N2 of the power assembly.

This theoretical model 24 may be in the form of a mathematical relationship stored in the storage device 23, or in a database, for example.

In order in particular to determine the values of the parameters used in the theoretical model 24, the processor unit is connected via wired and/or wireless connections to:

a temperature sensor 45 that continuously measures the outside temperature T0 of the air in the outside medium EXT;

a pressure sensor 50 that measures the outside pressure P0 of that air;

speed measurement means 65 measuring the first speed of rotation N1; and a conventional speed measurement system 35 measuring the second speed of rotation N2.

Furthermore, the storage device can store a model 25 of installation losses. This model 25 of installation losses is usually obtained by testing. Under such circumstances, the model of installation losses serves to determine the installation losses Wpi of the engine continuously during a flight, these installation losses Wpi representing a loss of power in newton meters (Nm) resulting from the engine being installed on an aircraft.

The installation loss model 25 can then deliver the installation losses Wpi as a function:

of the outside pressure P0 and of the outside temperature T0 of the air penetrating into the engine, and thus of the air present in the outside medium EXT situated outside the aircraft 1; and of a travel speed IAS of the aircraft.

In particular for the purpose of determining the value of the travel speed IAS, the processor unit is connected by wired and/or wireless links to a conventional speed measurement device 60 that measures the travel speed IAS of the aircraft.

Furthermore, the processor unit is connected by wired and/or wireless connections to a conventional torque measurement system 30 that measures the torque developed by the power assembly 19.

In addition, the detector device 20 may include a conventional engine health monitor system 55 co-operating with the processor unit 21.

This engine health monitoring system 55 may be an integral portion of an ECU or FADEC control system of the engine.

Under such circumstances, the engine health monitoring system 55 may be embodied by a segment of code stored in a storage device, the processor unit having another segment of code stored in the storage device.

Furthermore, the detector device is provided with a warning system 40 suitable for generating a visible or audible warning 41 on order from the processor unit 21.

Figure 2:
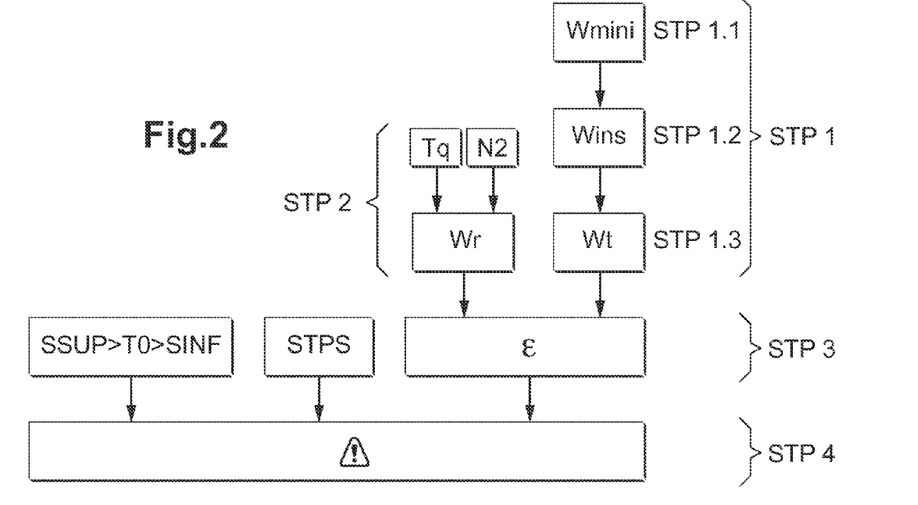
FIG. 2 is a diagram explaining the method of the invention.

The detector device 20 serves to apply the method of the invention as shown in FIG. 2 at a predetermined sampling frequency.

During a first stage STP 1, the processor unit determines a theoretical power Wt that ought in theory to be developed by the engine 10. This theoretical power Wt thus represents the power that the engine ought to be developing under normal conditions, i.e. in the absence of failures or clogging, e.g. as a result of ice being deposited.

Consequently, the processor unit runs the theoretical model of the engine in order to determine this theoretical power Wt.

For example, during a first step STP 1.1 of the first stage STP 1, the processor unit 32 determines a bench guaranteed minimum power Wmini by applying the theoretical model 24.

The theoretical power may be equal to this bench guaranteed minimum power Wmini.

Nevertheless, the processor unit 21 can determine the theoretical power by correcting the bench guaranteed minimum power Wmini with the help of at least one parameter selected from a list including the installation losses Wpi and the operating margin CSM.

Thus, during a second step STP 1.2 of the first stage STP 1, the processor unit can correct the bench guaranteed minimum power Wmini as a function of the installation losses Wpi.

Thereafter, the processor unit determines the installation losses Wpi as a function of a stored installation loss model 25.

Under such circumstances, the processor unit injects, e.g. into the installation loss model 25, the measured values of the outside pressure P0, of the outside temperature T0, and of the travel speed IAS.

The processor unit then deduces therefrom the installation losses Wpi.

Under such circumstances, the processor unit determines an engine-installed guaranteed minimum power on the basis of the following relationship in which "Wins" represents said engine-installed guaranteed minimum power, "Wmini"

represents said bench guaranteed minimum power, and "Wpi" represents the installation loses, and "−" represents the subtraction sign:

$$Wins = Wmini - Wpi$$

The theoretical power can then be equal to the engine-installed guaranteed minimum power Wins.

Nevertheless, during a third step STP 1.3 of the first stage STP 1, the processor unit can correct the engine-installed guaranteed minimum power Wins as a function of operating margins.

Under such circumstances, the processor unit consults the operating margin determined during the most recent health check of the engine.

An engine health check is performed periodically by the engine health monitoring system. On each health check, the detector device stores the operating margin as determined.

Consequently, the processor unit determines the theoretical power from the following sum, where "Wt" represents said theoretical power, "Wins" represents said engine-installed guaranteed minimum power, "CSM" represents the operating margin, and "+" represents the addition sign;

$$Wt = Wins + CSM$$

In a variant, the theoretical power is obtained by correcting the bench guaranteed minimum power by adding thereto the operating margin, and then deducting therefrom the installation losses.

In another variant, the theoretical power is obtained by correcting the bench guaranteed minimum power by adding thereto the operating margin and subtracting therefrom simultaneously the installation losses.

In another variant, the theoretical power is obtained by correcting the bench guaranteed minimum power solely by adding thereto the operating margin.

Independently of the variant, the processor unit acts during a second stage STP 2 to determine a real power Wr as developed by the engine 10.

This stage is referred to as the "second" stage for convenience. Nevertheless, the second stage can be performed at the same time as the first stage STP 1, or even before the first stage STP 1.

Consequently, the processor unit determines the real power by applying the following relationship where "Wr" represents said real power, "Tq" represents the torque measured by the torque measurement system 30, "N2" represents the second speed of rotation as measured by the speed measurement system 35, and "*" represents the multiplication sign:

$$Wr = Tq * N2$$

During a third stage STP 3, the processor unit determines whether three conditions are satisfied.

Under such circumstances, the processor unit determines a power difference $\epsilon$ between the real power Wr and the theoretical power, using the following relationship:

$$\epsilon = Wr - Wt$$

If the power difference is greater than a power threshold SP, then the processor unit deduces that the first condition is satisfied.

The power threshold SP may have a value of 150 Nm.

In addition, when the power threshold is exceeded, a time count is started, this time count being compared with a time threshold. If the power difference remains greater than the power threshold until the time count reaches the time threshold SIPS, then the processor unit deduces that the second condition is satisfied.

Consequently, the first condition and the second condition are both satisfied if the power difference $\epsilon$ is greater than the predetermined power threshold SP for a continuous duration that is greater than a time threshold SIPS.

For example, the power difference $\epsilon$ needs to remain greater than the power threshold SP for 30 second(s) in order to cause the processor unit to consider that both the first and second conditions are satisfied.

Furthermore, the processor unit compares the outside temperature T0 with a low temperature threshold SINF, of the order of −10 degrees Celsius (° C.) and to a high temperature threshold SSUP, of the order of +5° C.

If the outside temperature lies between the low threshold SINF and the high threshold SSUP, the processor unit considers that the third condition is satisfied.

Under such circumstances, during a fourth stage STP 4, the processor unit triggers a warning by sending a warning signal to the warning system 40 when all three above conditions are satisfied simultaneously.

Naturally, the present invention may be subjected to numerous variations as to its implementation. Although several embodiments are described, it will readily be understood that it is not conceivable to identify exhaustively all possible embodiments. It is naturally possible to replace any of the means described by equivalent means without going beyond the ambit of the present invention.

What is claimed is:

1. A method of detecting that an aircraft is flying in icing conditions, the aircraft having a turboshaft engine receiving air coming from an outside medium situated outside the aircraft via an air inlet, the engine including a gas generator provided with at least one compressor and a combustion chamber, the engine further including a power assembly having at least one power turbine driven in rotation by exhaust gas from the combustion chamber, the method comprising:

a processor unit determining a real power developed by the engine as a function of a torque developed by the power assembly as measured by a torque measurement system and of a speed of rotation of the power assembly as measured by a speed measurement system, the speed of rotation of the power assembly being referred to as a "second speed of rotation";

the processor unit determining a theoretical power that the engine can develop in theory, the theoretical power being determined by the processor unit as a function at least of a theoretical model of the engine, the theoretical model of the engine providing the theoretical power as a function at least of a speed of rotation of the gas generator as measured by a speed measurement sensor, the speed of rotation of the gas generator being referred to as a "first speed of rotation";

the processor unit determining a power difference between the real power and the theoretical power; and the processor unit generating a warning to indicate a presence of icing conditions when:

the power difference is greater than a predetermined power threshold for a duration longer than a time threshold; and an outside temperature of the outside medium as measured by a temperature sensor lies between a low temperature threshold and a high temperature threshold.

2. The method according to claim 1, wherein the processor unit determines the theoretical power as a function of a power referred to as a "bench guaranteed minimum power", the theoretical model of the engine providing the bench guaranteed minimum power as a function of a pressure and a temperature of the air in the outside medium, of the first speed of rotation, and of the second speed of rotation.

3. The method according to claim 1, wherein the processor unit determines the theoretical power as a function of a power referred to as a "bench guaranteed minimum power" as corrected using at least an installation loss representing power losses resulting from arranging the engine on an aircraft, and an operating margin of the engine representing a power margin of the engine compared to the bench guaranteed minimum power.

4. The method according to claim 3, wherein the processor unit:
  determines a power referred to as an "engine-installed guaranteed minimum power" that the engine can develop while arranged on the aircraft; and
  determines the theoretical power:
    by adding to the engine-installed guaranteed minimum power an operating margin obtained during an engine health check; and/or
    by subtracting from the engine-installed guaranteed minimum power the installation loss.

5. The method according to claim 3, wherein the processor unit:
  determines a power referred to as an "engine-installed guaranteed minimum power" that the engine can develop while arranged on the aircraft; and
  determines the theoretical power:
    by adding to the engine-installed guaranteed minimum power an operating margin obtained during an engine health check; and
    by subtracting from the engine-installed guaranteed minimum power the installation loss.

6. The method according to claim 3, wherein the processor unit:
  determines a power referred to as an "engine-installed guaranteed minimum power" that the engine can develop while arranged on the aircraft; and
  determines the theoretical power:
    by adding to the engine-installed guaranteed minimum power an operating margin obtained during an engine health check; or
    by subtracting from the engine-installed guaranteed minimum power the installation loss.

7. The method according to claim 1, wherein the processor unit:
  determines a power referred to as an "engine-installed guaranteed minimum power" that the engine can develop while arranged on the aircraft;
  determines an operating margin relative to the engine-installed guaranteed minimum power, the operating margin being established and transmitted to the processor unit by an engine health monitoring system; and
  determines the theoretical power, the theoretical power being equal to a sum of the operating margin plus the engine-installed guaranteed minimum power.

8. The method according to claim 7, wherein the processor unit:
  determines a power referred to as a "bench guaranteed minimum power" that the engine can develop while arranged on a bench;
  determines an installation loss representing power losses resulting from arranging the engine on an aircraft as a function of a stored installation loss model;
  determines the engine-installed guaranteed minimum power, the engine-installed guaranteed minimum power being equal to a difference between the bench guaranteed minimum power and the installation loss.

9. The method according to claim 8, wherein the installation loss model supplies the installation loss as a function of a pressure and of a temperature of the air in the outside medium and as a function of a travel speed of the aircraft.

10. The method according to claim 8, wherein the processor unit determines the bench guaranteed minimum power from the theoretical model of the engine, the theoretical model of the engine providing the bench guaranteed minimum power as a function of a pressure and of a temperature of the air in the outside medium, of the first speed of rotation, and of the second speed of rotation.

11. The method according to claim 1, wherein the low temperature threshold is −10 degrees Celsius.

12. The method according to claim 1, wherein the high temperature threshold is +5 degrees Celsius.

13. The method according to claim 1, wherein the time threshold is 30 seconds.

14. The method according to claim 1, wherein the power threshold is 150 newton-meters.

15. A detector device for detecting that an aircraft is flying in icing conditions, the aircraft having a turboshaft engine receiving air coming from an outside medium situated outside the aircraft via an air inlet, the engine including a gas generator having at least one compressor and a combustion chamber, the engine further including a power assembly having at least one power turbine driven in rotation by exhaust gas from the combustion chamber, the detector device comprising:
  a torque measurement system for measuring a torque developed by the power assembly;
  a first speed measurement system for measuring a speed of rotation of the power assembly and a second speed measurement system for measuring a speed of rotation of the gas generator;
  a warning system;
  a temperature sensor for measuring a temperature of the air in the outside medium situated outside the aircraft; and
  a processor unit connected to the torque measurement system, to the first speed measurement system, to the second speed measurement system, to the warning system, and to the temperature sensor, the processor unit including a storage device storing a theoretical model of the engine;
  wherein the processor unit determines a real power developed by the engine as a function of the torque developed by the power assembly and of the speed of rotation of the power assembly;
  wherein the processor unit determines a theoretical power that the engine can develop in theory, the theoretical power being determined by the processor unit as a function at least of the theoretical model of the engine, the theoretical model of the engine providing the theoretical power as a function at least of the speed of rotation of the gas generator;
  wherein the processor unit determines a power difference between the real power and the theoretical power; and
  wherein the processor unit generates a warning via the warning system to indicate a presence of icing conditions when:
    the power difference is greater than a predetermined power threshold for a duration longer than a time threshold; and an outside temperature of the outside medium as measured by the temperature sensor lies between a low temperature threshold and a high temperature threshold.

16. The detector device according to claim 13, the detector device further comprising an engine health monitoring system co-operating with the processor unit.

17. The detector device according to claim 13, the detector device further comprising an installation loss model stored in the memory of the processor unit.

18. The detector device according to claim 13, the detector device further comprising a pressure sensor for measuring a pressure of the air outside the aircraft.

19. The detector device according to claim 15, the detector device further comprising a speed measurement device for measuring a travel speed of the aircraft.

20. An aircraft comprising:
a turboshaft engine receiving air coming from an outside medium situated outside the aircraft via an air inlet, the engine including a gas generator having at least one compressor and a combustion chamber, the engine further including a power assembly having at least one power turbine driven in rotation by exhaust gas from the combustion chamber;
a detector device to detect that the aircraft is flying in icing conditions, the detector device including
a torque measurement system for measuring a torque developed by the power assembly;
a first speed measurement system for measuring a speed of rotation of the power assembly;
a second speed measurement system for measuring a speed of rotation of the gas generator;
a warning system;
a temperature sensor for measuring a temperature of the air in the outside medium situated outside the aircraft; and
a processor unit connected to the torque measurement system, to the first speed measurement system, to the second speed measurement system, to the warning system, and to the temperature sensor, the processor unit having a storage device storing a theoretical model of the engine;
wherein the processor unit determines a real power developed by the engine as a function of the torque developed by the power assembly and of the speed of rotation of the power assembly;
wherein the processor unit determines a theoretical power that the engine can develop in theory, the theoretical power being determined by the processor unit as a function at least of the theoretical model of the engine, the theoretical model of the engine providing the theoretical power as a function at least of the speed of rotation of the gas generator;
wherein the processor unit determines a power difference between the real power and the theoretical power; and
wherein the processor unit generates a warning via the warning system to indicate a presence of icing conditions when:
the power difference is greater than a predetermined power threshold for a duration longer than a time threshold; and
an outside temperature of the outside medium as measured by the temperature sensor lies between a low temperature threshold and a high temperature threshold.

* * * * *